(12) United States Patent
Hooten et al.

(10) Patent No.: US 10,884,192 B1
(45) Date of Patent: Jan. 5, 2021

(54) SINGLE-ETCH WIDE-BANDWIDTH GRATING COUPLERS WITH INDIVIDUALLY-TUNED GRATING SECTIONS

(71) Applicant: Hewlett Packard Enterprise Development LP, Houston, TX (US)

(72) Inventors: Sean Hooten, Palo Alto, CA (US); Thomas Van Vaerenbergh, Diegem (BE); Peng Sun, Palo Alto, CA (US); Raymond G. Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/715,954

(22) Filed: Dec. 16, 2019

(51) Int. Cl.
   *G02B 6/34* (2006.01)
(52) U.S. Cl.
   CPC ........................... *G02B 6/34* (2013.01)
(58) Field of Classification Search
   None
   See application file for complete search history.

(56) References Cited

U.S. PATENT DOCUMENTS

| | | |
|---|---|---|
| 6,483,959 B1 | 11/2002 | Singh et al. |
| 7,046,892 B2 | 5/2006 | Yoshikawa et al. |
| 8,200,054 B1 | 6/2012 | Li et al. |
| 2019/0011735 A1 | 1/2019 | Tan et al. |

FOREIGN PATENT DOCUMENTS

WO  2004/112050 A1  12/2004

OTHER PUBLICATIONS

Bogaerts et al., "A Polarization-Diversity Wavelength Duplexer Circuit in Silicon-on-Insulator Photonic Wires", Optics Express, vol. 15, No. 4, Feb. 19, 2007, pp. 1567-1578.
Mak et al., "Silicon Nitride-on-Silicon bi-Layer Grating Couplers Designed by a Global Optimization Method", Optics Express, vol. 26, No. 10, May 14, 2018, pp. 13656-13665.
Michaels et al., "Inverse design of near unity efficiency perfectly vertical grating couplers", Optics Express 26, Feb. 19, 2018, pp. 4766-4779.
Verslegers et al., "Design of Low-Loss Polarization Splitting Grating Couplers", Advanced Photonics for Communications, Jan. 2014, 3 pages.
Watanabe et al., "Perpendicular Grating Coupler Based on a Blazed Anti-Back-Reflection Structure", Journal of Lightwave Technology, Sep. 2017, 8 pages.

(Continued)

*Primary Examiner* — Jerry Rahll
(74) *Attorney, Agent, or Firm* — Sheppard Mullin Richter & Hampton LLP

(57) ABSTRACT

Examples herein relate to single-etch layer grating couplers. In particular, implementations herein relate to single-etch layer grating couplers comprising a planar waveguide wherein a first grating section and a second grating section are etched into. The first grating section is configured to scatter light at a given wavelength at a first angle relative to vertical and the second grating section is configured to scatter light at the given wavelength at a second angle relative to vertical. The stagger-tuning of the first grating section and the second grating section results in the light at the given wavelength being scattered at a desired angle the same or near an angle at which an optical fiber is offset from vertical.

18 Claims, 4 Drawing Sheets

(56) References Cited

OTHER PUBLICATIONS

Wilmart et al., "A hybrid SOI/SiN photonic platform for high-speed and temperature insensitive CWDM optical transceivers", Proceedings, Silicon Photonics XIII, vol. 10537, Feb. 22, 2018, pp. 1053709-1-1053709-9.
Zou, J. et al., "Ultra Efficient Silicon Nitride Grating Coupler with Bottom Grating Reflector", Optics Express, vol. 23, No. 20, Oct. 23, 2015, 9 pages.

SINGLE-ETCH WIDE-BANDWIDTH GRATING COUPLERS WITH INDIVIDUALLY-TUNED GRATING SECTIONS

STATEMENT OF GOVERNMENT RIGHTS

This invention was made with Government support under Agreement Number H98230-19-3-0002. The Government has certain rights in the invention.

DESCRIPTION OF RELATED ART

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Silicon photonics concerns the design of optical structures and devices that utilize silicon as the optical medium. The need for high-efficiency, low-latency data communications in data centers and high performance computing systems has propelled the development of silicon photonics.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
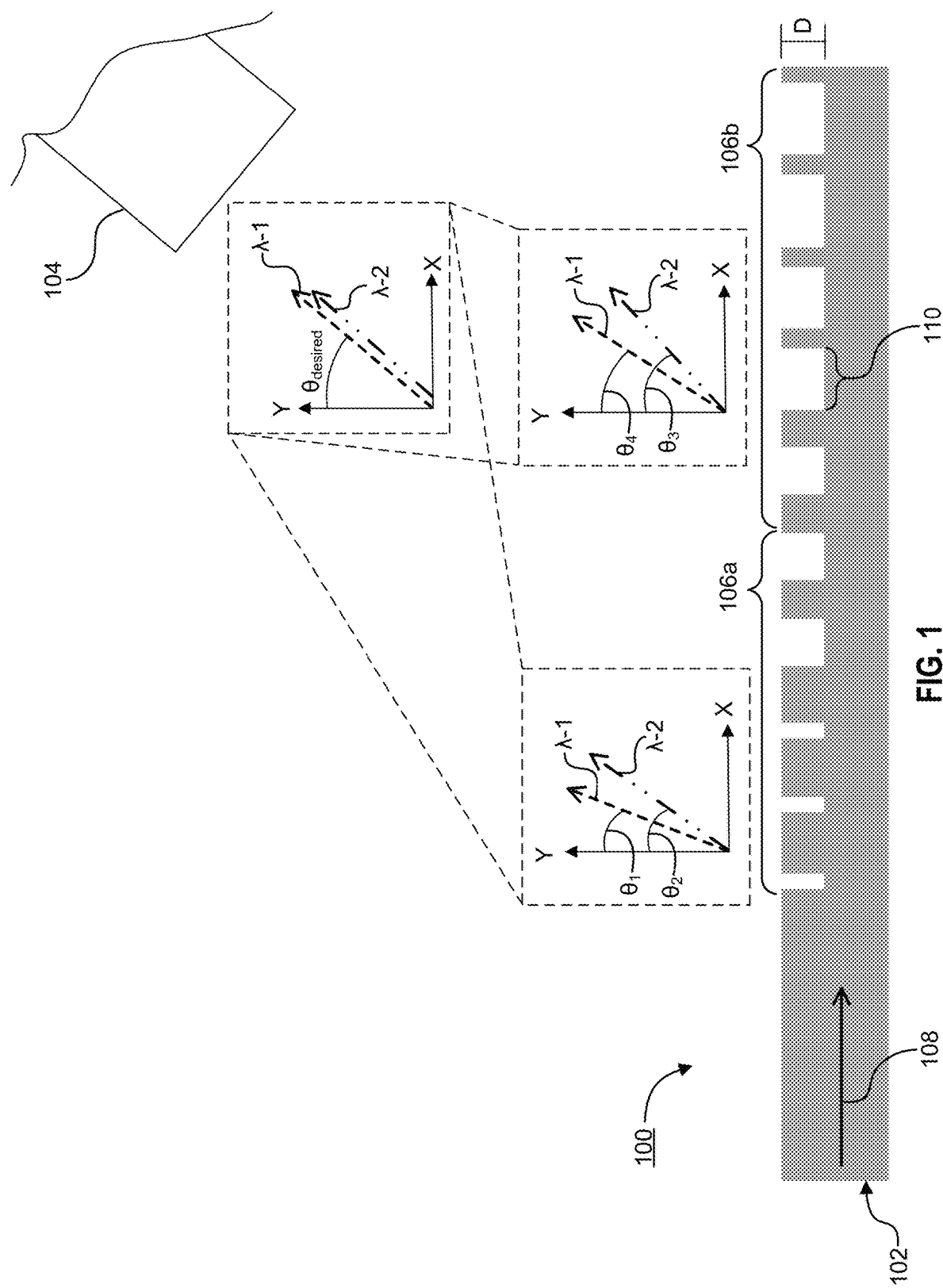
FIG. 1 depicts an example stagger-tuned grating coupler in accordance with embodiments of the technology disclosed herein.

The figures are not exhaustive and do not limit the present disclosure to the precise form disclosed.

DETAILED DESCRIPTION

The development of high-efficiency silicon photonic links is being pursued to reduce power consumption in data communications on a server- and chip-level scale. Although optical data communication is a promising technology, many technical challenges in the design of photonic devices must be overcome. One major technical challenge of silicon photonics is the coupling of light on and off of photonic chips to external interconnects. Grating couplers are microscale passive devices that can efficiently convert a guided wave in a waveguide to a largely unidirectional output beam of a desired mode shape via the constructive interference of periodically etched trenches (or scatterers). Grating couplers traditionally consist of an optical waveguide that is etched in a spatially periodic manner to provide a phase matching condition between a guided mode in the waveguide and far-field scattered modes.

Conventional grating coupler designs enable coupling of light, there is generally a trade-off between overall coupling efficiency, reflection back into the waveguide, and the angle of an off-chip optical fiber (e.g., difficulty in optimizing for small input/output angles while maintaining low reflection and high overall coupling efficiency). Due to fundamental physical limitations, it is very difficult to scatter light vertically (i.e., perpendicular to the photonic chip) using conventional single-etch grating designs because of large back reflection to the input. Consequently, grating couplers claiming to provide vertical coupling typically scatter light at an angle to vertical, instead of truly perpendicular. From a photonic chip packaging perspective, compensating for this off-vertical scattering is undesirable. Such compensation can become costly and complex in terms of both additional components and optical losses. This increases the overall size of the packaging required for the photonic chip as well, and also makes the design of optical connectors (to connect the photonic chip to an external device) more complex.

To circumvent this problem, many conventional grating coupler designs incorporate additional elements or design approaches aimed to reduce the impact of off-vertical coupling through the addition of other components (thereby, adding more degrees of freedom that may be adjusted in the design). For example, some current solutions exploit multiple etch depths across the grating coupler, multiple patterned layers of various different materials, sub-wavelength features for anti-reflection, back-side metal mirrors or Bragg reflectors, or angled-etch "blazed" designs. Unfortunately, many of these designs are impractical from the perspective of conventional silicon-on-insulator (SOI) fabrication techniques, whereas others suffer from high fabrication sensitivity (e.g., mask misalignment for multiple layers or etches, material thickness, grating etch depth, grating period, etc.). For example, requiring multiple etches or using multiple layers increases the fabrication complexity and the need for high fabrication precision. Moreover, grating couplers are equally sensitive to environmental change, e.g., temperature fluctuations. Fabrication inaccuracies and temperature change may result in problems with various system parameters, such as coupling efficiencies/coefficients, optical bandwidth, or wavelength (e.g., Bragg grating wavelength), especially with respect to vertical scattering of the light.

Moreover, typical grating couplers only operate over a narrow bandwidth because couplers are designed to emit light at one specific angle. The periodicity of the coupler across the grating line results in light scattered at a desired angle due to interference. The off-chip optical fiber is generally positioned at the same angle, thereby enabling the light at that angle to be coupled into or out of the optical fiber. Because of this specific angle design, grating couplers are typically only optimized for a narrow bandwidth, with the coupling efficiency outside of this range falling drastically due to the off-angle nature of light at other wavelengths not tied to the specific angle. Therefore, most grating couplers are not suited for use in wide bandwidth applications, such as in coarse wavelength division multiplexing (CWDM) applications. In some instances, additional grating layers and/or complex shapes for the grating teeth (i.e., trenches) may be used to try and increase the effective range of the grating coupler, but such approaches may be beyond the capabilities of SOI fabrication techniques, resulting in couplers that are sensitive to environmental changes.

Embodiments of the present disclosure provide grating couplers that are capable of high coupling efficiency over a wide bandwidth utilizing a single-etch layer. In this manner, grating couplers in accordance with the technology disclosed herein are less sensitive to fabrication tolerances compared to multiple layer and/or multiple etch approaches, while still providing effective scattering over a wider bandwidth for coupling into an external interconnect (e.g., an optical fiber). Various embodiments discussed herein provide stagger-tuned grating couplers. "Stagger-tuned" means that different sections along the grating coupler are tuned such that light at different wavelengths are scattered at varying angles. Over the length of the stagger-tuned grating coupler, interference results in light at different wavelengths being scattered at the same desired angle, enabling effective coupling of light over a wider band into the external interconnect. Because of the tuning of the different sections of the coupler, a wider band of wavelengths can be scattered at a desired scattering angle using a single etch, without the need for additional mirrors, Bragg reflectors, or the like to be included to compensate for back reflection and increase coupling efficiency. Moreover, single-etch vertical scattering is possible by creating a coupler design that scatters light at both negative and positive angles across the coupler, resulting in a net scattering angle of zero degrees.

An "optical fiber" as described herein can refer to a single optical fiber (e.g., including a core and a cladding) to provide unidirectional or bidirectional optical communication, a bidirectional pair of optical fibers (e.g., each including a core and a cladding) to provide both transmit and receive communications in an optical network, or a multi-core fiber (e.g., a single cladding encapsulating a plurality of single-mode cores).

FIG. 1 depicts an example stagger-tuned grating coupler 100 in accordance with embodiments of the present disclosure. The stagger-tuned grating coupler 100 is provided for illustrative purposes only and should not be interpreted as limiting the scope of the technology solely to the depicted embodiment. Moreover, for ease of discussion, the dimensions of the depicted embodiment are not shown to scale. Example dimensions and parameters shall be discussed in the following description, where appropriate, to further explain how the stagger-tuned grating coupler 100 of FIG. 1 can be designed to arrive at a desired scattering angle. In various embodiments, the stagger-tuned grating coupler 100 is configured to couple light from a planar waveguide 102 into an optical mode in the optical fiber 104. Although depicted as coupling light from the planar waveguide 102 into the optical fiber 104, the stagger-tuned grating coupler 100 is also configured to enable light to couple from the optical fiber 104 into the planar waveguide 102 due to the principle of reciprocity. Although discussed with respect to coupling light with reference to an optical fiber 104, the stagger-tuned grating coupler 100 may be configured in other embodiments to couple light into or out of optical connectors, optical components of such optical connectors, as well as integrated photonics chips (e.g., stacks of silicon photonic chips). For example, the stagger-tuned grating coupler 100 can be configured to couple light into or out of an on- or off-chip lens, mirror, prism, or ferrule of an optical connector. In various embodiments, the stagger-tuned grating coupler 100 can be a 1D (i.e., single polarization) or a 2D (i.e., dual polarization) grating coupler.

As shown in FIG. 1, the stagger-tuned grating coupler 100 comprises a planar waveguide 102. In the depicted embodiment, a first grating section 106a and a second grating section 106b are etched into the planar waveguide 102, each of the first grating section 106a and the second grating section 106b (collectively, "the grating sections 106), each having the same etch depth. In this way, the first grating section 106a and the second grating section 106b represent a single layer etched coupler region of the planar waveguide 102. Although only two grating sections 106 are shown in FIG. 1, the stagger-tuned grating coupler 100 may comprise a plurality of grating sections 106, depending on the implementation. The first grating section 106a can start at the first trench 110 of the stagger-tuned grating coupler 100 and extend for a first subset of grating indices, while the second grating section 106b can start at the first trench 110 after the end of the first subset of grating indices and extend to the last trench 110 of the stagger-tuned grating coupler 100.

Each of the grating sections 106 may be configured such that rays of light of a given wavelength are scattered by the respective grating section 106 at a specific angle relative to the vertical or Y-axis. For example, as shown in FIG. 1, the first grating section 106a can be configured such that light of a first wavelength λ-1 of an input light signal 108 is scattered at a first angle $\theta_1$ relative to a vertical or Y-axis and that light of a second wavelength λ-2 of an input light signal 108 is scattered at a first angle $\theta_2$ relative to a vertical or Y-axis. The second grating section 106b can be configured to scatter light of the first wavelength λ-1 and the second wavelength λ-2 at a third angle $\theta_3$ and a fourth angle $\theta_4$, respectively. Through interference, the two scattered rays of light at each wavelength results in the combination of the grating sections 106 outputting both the first wavelength λ-1 and the second wavelength λ-2 at or near a desired angle $\theta_{desired}$ relative to the vertical or Y-axis. This can increase the bandwidth of the stagger-tuned grating coupler 100 using a single-etch layer, without the need for additional layers and/or other components to try and increase the applicable bandwidth. As a non-limiting example, the stagger-tuned grating coupler 100 may be configured such that the coupling efficiency spectrum consists of two stagger-tuned parabolas, one peak centered at 1275 nm and the second peak centered at 1325 nm, respectively. Such a configuration provides a peak loss of 2.25 dB and a 1 dB bandwidth of 40 nm. In this manner, a single-etch coupler in accordance with the stagger-tuned grating coupler 100 of FIG. 1 is applicable for a wider bandwidth of wavelengths, from 1260 nm to 1300 nm.

Each grating section 106 comprises a plurality of trenches 110 etched into the planar waveguide 102. In various embodiments, the width of each trench and/or the pitch may vary based on the grating line. The grating line (or index) refers to the positional number of a given period (i.e., pitch) of the grating coupler, from the leading edge of one trench to the leading edge of the next trench. As the grating line increases, the dimensions of the trench and the pitch can vary. In some embodiments, the dimensions of the trench and the period may vary from one grating line to the next parabolically, linearly, or remain the same. In various embodiments, the number of periods within each grating section 106 may be the same, while in other embodiments the number of periods within each grating section 106 may be different.

In various embodiments, the stagger-tuned grating coupler 100 can be phase matched with a cladding layer (not shown in FIG. 1) disposed on the grating sections 106. The grating wavevector minus the grating perturbation vector should equal the projection of the fiber wave vector. The local cladding effective index for each grating line can be defined as $$n_{e,clad} = \frac{\text{trench} \times n_{etched} + \text{grate} \times n_{slab}}{\text{pitch}} - \frac{\lambda}{\text{pitch}}, \quad (1)$$

wherein trench is the width of a trench of a given grating line (or index), $n_{etched}$ is the refractive index of the etched-portion of the planar waveguide 102 for the grating line, grate is the width of the non-etched portion of the planar waveguide 102 (i.e., the grating element next to the respective trench), $n_{slab}$ is the refractive index of the grating element, pitch is the total width of the trench and the grating element (i.e., the period), and λ is the wavelength. Using the local cladding effective index for each grating line within the a given grating section 106, the equivalent beam angle from a specific cladding effective index can be determined as $$\theta = \arcsin\left(\frac{n_{e,clad}}{n_{clad}}\right). \quad (2)$$

The equivalent beam angles can be used to determine the changes between each grating line to arrive at an intended scattering angle for a specific wavelength from a given grating section 106.

In various embodiments, one or more grating sections 106 can be configured with one or more grating line subsets (not shown in FIG. 1). A grating line subset for purposes of this disclosure refers to a subset of trenches which correspond to a respective dimensional parameters. For example, the first grating section 106a can be configured with a first grating line subset wherein the trench widths and the pitch at each grating line are configured to ramp (or increase) parabolically, and a second grating line subset can be configured such that the trench width and the pitch of each grating line remains constant for the width of the second grating line subset. In various embodiments, one or more grating line subsets may be configured to have a constant duty cycle of or near 50%.

Figure 2:
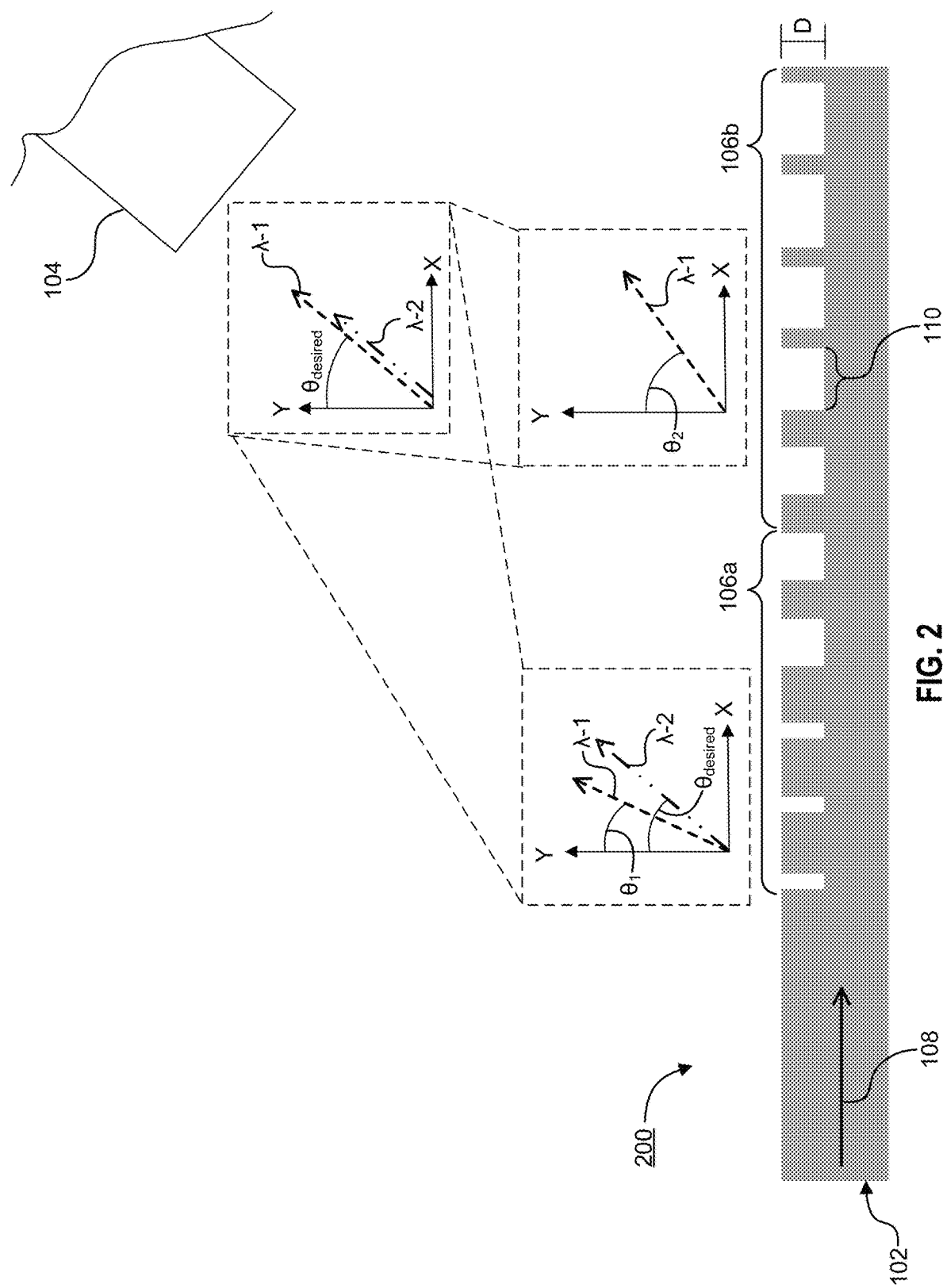
FIG. 2 depicts another example stagger-tuned grating coupler in accordance with embodiments of the technology disclosed herein.

FIG. 2 illustrates another example stagger-tuned grating coupler 200 in accordance with embodiments of the technology disclosed herein. The stagger-tuned grating coupler 200 is similar to the stagger-tuned grating coupler 100 discussed with respect to FIG. 1. Common references between FIGS. 1 and 2 should be interpreted as referring to the same or similar components, and any description related to such references should be interpreted as applying equally to all instances of the reference unless stated otherwise. As shown in FIG. 2, the first grating section 106a can be configured to scatter light of the first wavelength λ-1 at a first angle $\theta_1$ and light at a second wavelength λ-2 at the desired angle $\theta_{desired}$. Unlike the first grating section 106a of FIG. 1, the first grating section 106a of FIG. 2 is capable of scattering the second wavelength λ-2 at the desired angle $\theta_{desired}$, meaning that the second grating section 106b can be configured to scatter only light of the first wavelength λ-1. The result of the two grating sections 106 is light of both the first wavelength λ-1 and the second wavelength λ-2 being coupled to the optical fiber at the desired angle $\theta_{desired}$.

Simulations have shown that grating couplers designed in accordance with the stagger-tuned grating couplers 100 and/or 200 discussed herein provide higher efficiency coupling over a wider bandwidth using a single-etch layer. The stagger-tuned grating couplers were designed utilizing the adjoint method of design that is known in the field. The figure of merit used to optimize the design using the adjoint method was an average of the coupling efficiency at two different wavelengths, specifically 1270 nm and 1330 nm. The initial conditions were chosen as an initial trench width of 20 nm with a linear ramp of 19 nm, an initial pitch (i.e., period) of 460 nm with a linear pitch ramp of 2.28 nm, and a minimum grate width being capped at 60 nm in the tail of the grating coupler. After optimizing for the figure of merit, the stagger-tuned grating coupler design included a first grating section having two grating line subsets and a second grating section having two grating line subsets. The first grating line subset of the first grating section starts at the first trench of the first grating section and ramps parabolically in both the trench width and pitch for eight periods (i.e., for grating indices 0 to 7). The parabolic ramp of the trench width occurs parabolically at a curvature of roughly 4.7 nm, while the pitch ramps up parabolically at a curvature of roughly 0.9 nm. The second grating line subset of the first grating section begins on the ninth period (i.e., grating index 8) and extends for four periods (i.e., grating indices 8-11). The trench and pitch remains constant through the second grating line subset, corresponding to a duty cycle of at or near 50%. The scattering strength of a grating coupler is close to a Gaussian function of the duty cycle, with peaks at a duty cycle of 50% and essentially non-existent at duty cycles of near 0% or near 100% (i.e., the ends of a Gaussian curve). For purposes of this disclosure, "near" 50% can encompass a duty cycle of 50%±10%. In various embodiments, a phase match offset may be included between the last trench of the first grating line subset and the first trench of the second grating line subset of the first grating section. The phase match offset may be used to ensure that the second grating line subset has a constant or near constant duty cycle.

At the end of the second grating line subset of the first grating section, a jump in the trench width may occur to separate the first grating section and the second grating section. In the testing example, the second grating section starts on a trench with a width roughly 70 nm wider than the last trench of the first grating section. Moreover, the first pitch of the second grating section can start roughly 25 nm shorter than the last pitch of the first grating line subset of the first grating section. This starts the first grating line subset of the second grating section. The first grating line subset of the second grating section comprises four periods (i.e., grating indices 12-15). The second grating line subset of the second grating section may begin at the next grating line (i.e., grating line 16), or the second grating line subset may begin at the grating line at which a limit on the size of the grate (i.e., the grate minimum of 60 nm) is reached. In various embodiments, the trench widths and pitch within the second grating line subset may vary based on the grating line. The second grating line subset of the second grating section may not contribute to the effective scattering angle of light to or from the stagger-tuned grating coupler in various embodiments because the second grating line subset is too far from the center of the optical fiber's 104 Gaussian mode and/or the duty cycle within the second grating line subset of the second grating section has a duty cycle closer to the 0% or 100% extremes of the Gaussian function (i.e., has very low scattering strength).

Using the stagger-tuned grating coupler as designed above, the first section is configured to scatter light of a wavelength of 1275 nm at 11.5 degrees relative to the vertical or Y-axis, and scatter light of a wavelength of 1323 nm at 7.2 degrees relative to the vertical or Y-axis. This scattering is the cumulative scattering of the light scattered by the first grating line subset and the second grating line subset of the first grating section. The second grating section has a roughly 25 nm shorter pitch and scatters light at a wavelength of 1275 nm at roughly 6.7 degrees relative to the vertical or Y-axis. In combination with the light of wavelength 1275 nm scattered by the first grating section, the mode of light at 1275 nm wavelength is scattered at a roughly 8 degree angle, resulting in a mode for roughly 8 degree angle of the optical fiber. Moreover, because the first section already scatters light at 1323 nm at a roughly 8 degree angle, the resulting grating coupler is capable of coupling light at the 1323 nm wavelength into the optical fiber in the mode at roughly an 8 degree angle, as well.

In various embodiments, the stagger-tuned grating couplers 100 and/or 200 may comprise a SOI substrate. The SOI substrate may comprise silicon or other suitable semiconductor substrate layer with an insulating layer disposed between the silicon or other suitable semiconductor substrate layer and the planar waveguide 102. In various embodiments, the insulating layer may be a buried oxide (BOX) layer and may be composed of silicon dioxide or another suitable insulating oxide material.

By stagger tuning the different sections, the stagger-tuned grating couplers in accordance with embodiments of the present disclosure are capable of providing wide bandwidth operation using a single-etch layer. In this manner, effective coupling over a wide band is enabled without the need for complex etching designs, additional components, or other difficult constructs that increase the difficulty of fabrication. Moreover, using the stagger-tuning approach disclosed herein, a single-etch layer grating coupler can be designed that provides vertical or near vertical coupling of light with high coupling efficiency.

Achieving effective coupling efficiency on the vertical utilizing a single-etch is difficult. Fundamentally, uniform single etch grating couplers that scatter light vertically will also have strong back reflections. The relationship between the grating spacing and the angles of the incident and diffracted beams of light is known as the grating equation $$\varphi_\Lambda = k_0 \Lambda \sin \theta + 2\pi m, \tag{3}$$

wherein $\varphi_\Lambda$ is the phase collected across one grating period ($\Lambda$), $k_0$ is the wave number of the cladding medium, m is an integer, and $\theta$ is the angle of the output beam relative to zenith. After input light scatters from a first trench (i.e., scatterer), light that is not scattered will continue to propagate, collect a spatial phase $\varphi_\Lambda$, and then partially scatter at the next trench.

If the vertical scattering condition is satisfied, $$\varphi_\Lambda = 2\pi m, \tag{4}$$

for integer m, then scattered light at each trench will interfere constructively in the vertical direction. However, a similar constructive interference condition occurs when $$2\varphi_\Lambda = 2\pi n, \tag{5}$$

for integer n=2m. As discussed above, current approaches seek to overcome this problem by adding complexity to the design in the form of adding layers, multiple etchings, mirrors, and the like discussed above. In this way, more degrees of freedom are added to the system that can be manipulated to avoid this problem.

Figure 3:
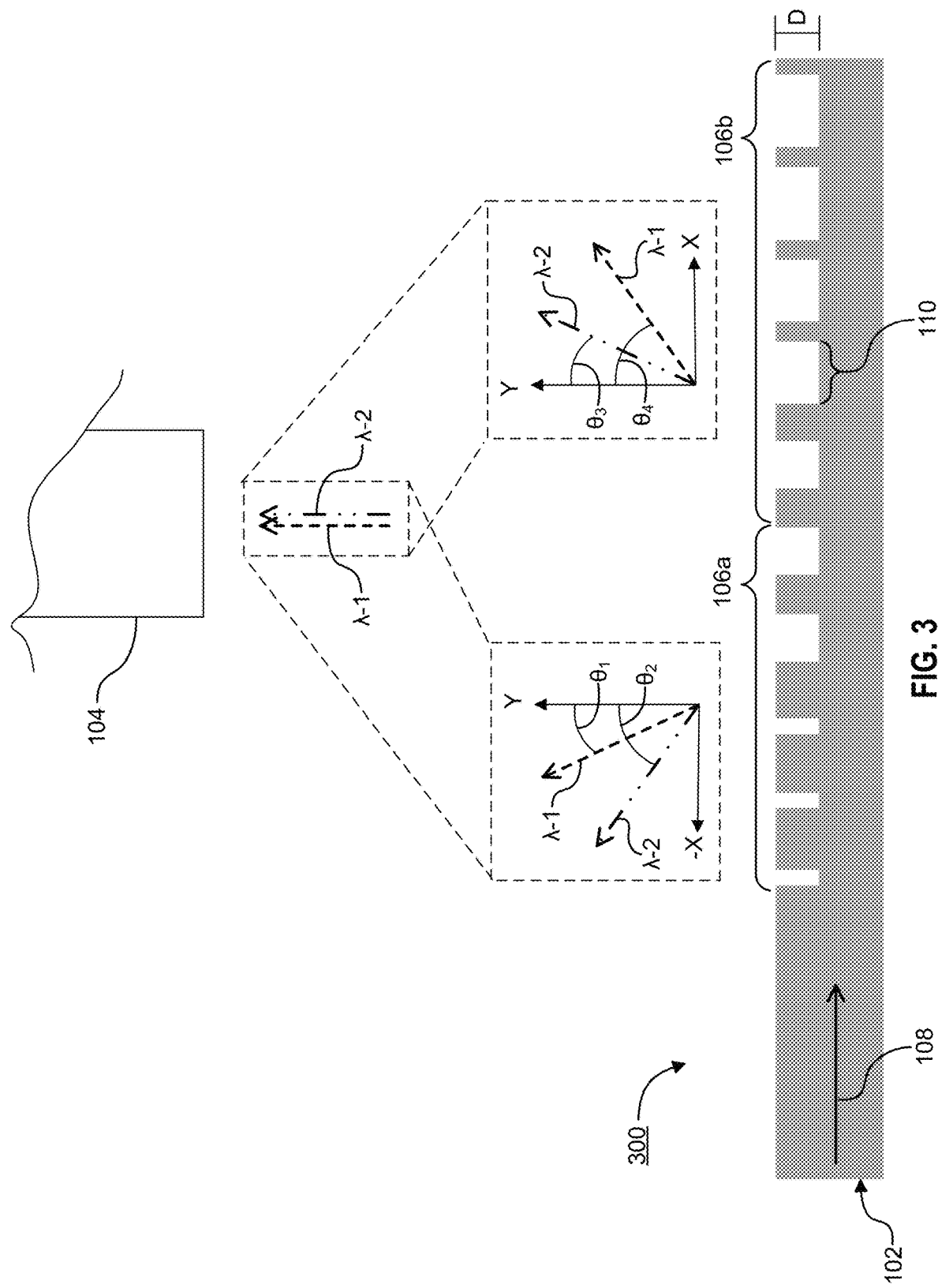
FIG. 3 depicts another example stagger-tuned grating coupler configured for vertical scattering in accordance with embodiments of the technology disclosed herein.

FIG. 3 illustrates an example stagger-tuned grating coupler 300 configured to provide vertical scattering of light in accordance with embodiments of the technology disclosed herein. The stagger-tuned grating coupler 300 is similar to the stagger-tuned grating couplers 100 and 200 discussed above with respect to FIGS. 1 and 2. Where common references are used, the description corresponding to those references apply equally to FIG. 3. Rather than tuning each section of the grating layer to result in a wide band of wavelengths being scattered at a desired angle, the stagger-tuned grating coupler 300 is designed such that the net scattering effect of the different grating sections results in vertical scattering. As depicted in FIG. 3, the first grating section 106a may be configured to scatter light at one or more wavelengths to be scattered at negative angles relative to the vertical or Y-axis, while the second grating section 106b is configured to scatter light at one or more wavelengths at positive angles to relative to the vertical or Y-axis. In this way, vertical scattering is capable without the additional complexity of current approaches.

In various embodiments, the stagger-tuned grating coupler 300 may be optimized for a single wavelength. As a non-limiting example, the stagger-tuned grating coupler 300 can be optimized for a wavelength of 1310 nm. Although discussed with respect to a wavelength of 1310 nm, the technology disclosed herein is not limited to only that wavelength and a person of ordinary skill in the art would understand the optimization approach discussed herein is applicable for optimization of any specific wavelength of interest. The optimization of the stagger-tuned grating coupler 300 can be defined as $$F^* = \max_x [\eta(E, H) - p(x)], \tag{6}$$

where x is a vector of optimization parameters that describe the grating coupler geometry, $\eta(E, H)$ is the coupling efficiency to a Guassian fiber mode (e.g., beam diameter=9.2 µm at $\lambda$=1310 nm), defined explicitly in terms of the electric and magnetic fields E and H but is only implicitly related to x via Maxwell's equations, and p is a penalty function that is explicilty a function of the design parameters x. Including the penalty function enables the practical constraints that are imposed on fabrication of such devices to be considered, such as feature sizes or radius of curvature.

To optimize for the single wavelength discussed above, the trenches of the grating coupler can be parameterized, as a non-limiting example, using a Fourier series to allow for a smooth functional evolution of the device geometry, $$F^* = a_0 + \sum_{m=1}^{M} \left[ a_m \sin\left(m\frac{\pi}{2}\frac{n}{N}\right) + b_m \cos\left(m\frac{\pi}{2}\frac{n}{N}\right) \right], \tag{7}$$

where n is the grating index or line, N is the total number of trenches, M is the number of Fourier series terms, and the $a_m$ and $b_m$ coefficients (along with the coefficients from the identical function for the duty factor) represent the optimization variables from equation 6. Treating the pitch and duty cycle of each grating trench as individual optimization variables allows for the penalty function of equation 6 to implement minimum feature size constraints on the width of the trenches. The results after optimization and imposing a minimum feature size of 30 nm reached a peak insertion loss for the single-etch design of −0.55 dB, with a 1 dB bandwidth of the grating coupler of less than 3 nm. This example of small 1 dB bandwidth at perfect vertical coupling is far from desirable in wide bandwidth applications.

While the single-frequency optimization performed well at the wavelength of interest, the bandwidth of the device was not compatible with wide bandwidth applications, such as DWDM or CWDM applications, where a roughly 20 nm 1 dB-bandwidth or roughly 70 nm 1 dB-bandwidth, respectively, is desirable. To increase the bandwidth of the single-etch stagger-tuned grating coupler 300 equation 6 above can be modified as $$F^* = \max_x \left[ \sum_\lambda c_\lambda \eta(E_\lambda, H_\lambda, \lambda) - p(x) \right], \quad (8)$$

which implements a weighted average of the coupling efficiency across multiple discrete wavelengths, with user-defined weights $c_\lambda$ and coupling efficiency that are now wavelength dependent. Using the user-defined weights, equation 8 can be used to optimize for any number of discrete wavelengths. For certain electromagnetic field techniques, more wavelengths might imply longer simulation time. As a non-limiting example, the stagger-tuned grating coupler 300 can be optimized for three wavelengths, specifically 1305 nm, 1310 nm, and 1315 nm, with user defined weights 0.4, 0.2, and 0.4, respectively.

In comparison to the single-wavelength optimized coupler discussed above, the multi-wavelength optimized coupler reaches a peak insertion loss of −1.0 dB with a 1-dB bandwidth of 19 nm, which is a six times improvement over the single wavelength optimized device. Moreover, the reflection profile of the device optimized for multiple wavelengths became more broadband, enabling greater coupling efficiency over a wider band of frequencies. The resulting stagger-tuned grating coupler 300 optimized for multiple wavelengths results in a first grating section 106a that scatters light at the various wavelengths at a negative angle relative to the vertical and a second grating section 106b that scatters light at the various wavelengths at a positive angle relative to the vertical. In this way, the net scattering effect is that the light over the wide bandwidth (i.e., over the 19 nm identified above) is vertical, resulting in vertical scattering using a single-etch layer.

The design of the stagger-tuned grating coupler 300 scatters light vertically while maximizing mode overlap and minimizing back-reflection. Similar to the stagger-tuned grating couplers 100 and 200 discussed above, the reflection spectrum of the stagger-tuned grating coupler 300 includes two distinct peaks, each centered at a different wavelength. This further shows that the first grating section and the second grating section of the stagger-tuned grating coupler 300 each scatter light at two angles slightly off-vertical, resulting in the cancellation of lateral field components and net vertical scattering. In some embodiments, more grating sections may be included, each designed to scatter light at either a negative angle or a positive angle relative to vertical. In some embodiments, the first grating section 106a and the second grating section 106b may each comprise at least one grating line subset that scatters light at a negative angle relative to vertical and at least one grating line subset that scatters light at a positive angle relative to vertical. In this way, each of the first grating section and the second grating section may output light vertically independently of each other. In various embodiments, the position of the grating line subsets of the first grating section and/or the second grating section further reduces the amount of light that is reflected back into the planar waveguide 102.

Figure 4:
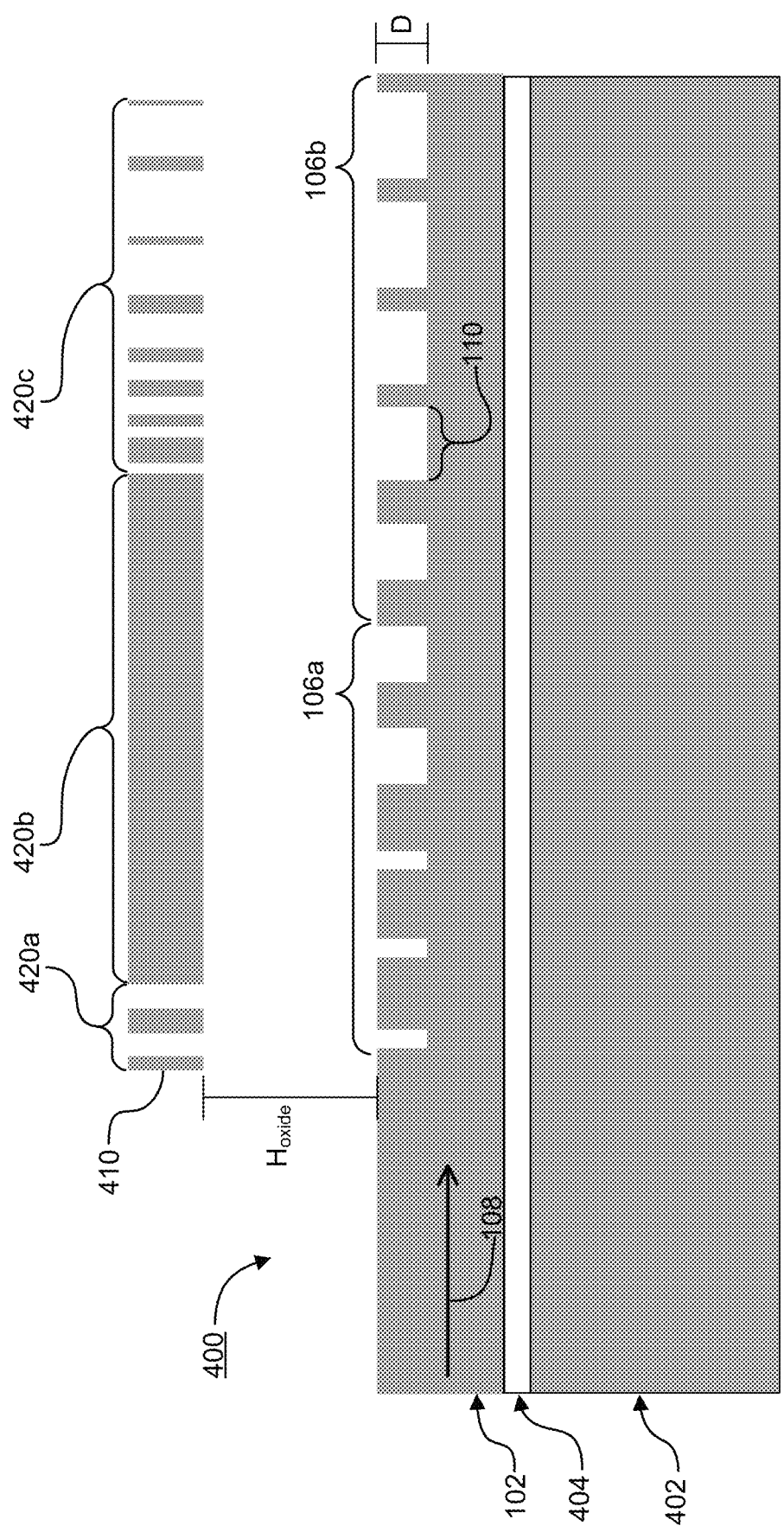
FIG. 4 depicts another example stagger-tuned grating coupler configured for vertical scattering in accordance with embodiments of the technology disclosed herein.

In some embodiments, coupling efficiency may be further improved by disposing a silicon nitride (SiN) focusing layer above the first grating section and the second grating section. FIG. 4 illustrates an example of stagger-tuned grating coupler 400 having a SiN focusing layer 410 disposed above in accordance with embodiments of the technology disclosed herein. Although described as comprising SiN, in other embodiments one or more other dielectric materials may be used to serve as the focusing layer. Non-limiting examples of other dielectric materials applicable include silicon dioxide ($SiO_2$), silicon oxynitride ($SiO_xN_y$), or other dielectric materials common in the field.

The stagger-tuned grating coupler 400 of FIG. 4 is illustrated as comprising a SOI device, with the silicon or semiconductor substrate layer 402 and insulating layer 404 shown disposed below the planar waveguide 102. In various embodiments, the SiN focusing layer 410 functions as an anti-reflection layer. The SiN focusing layer 410 can be separated from the first grating section 106a and the second grating section 106b by an oxide layer (not shown in FIG. 4). The oxide layer may have a height $H_{oxide}$. In some embodiments, the height $H_{oxide}$ may vary depending on the implementation. In test, an oxide height $H_{oxide}$ of 200 nm was utilized. The directionality improvement offered by the SiN focusing layer 410 is periodic in the SiN focusing layer 410 thickness, with some dependence on the thickness (i.e., height) of the oxide layer $H_{oxide}$. Specifically, the dependence of the thickness of the SiN focusing layer 410 and the oxide layer (not pictured in FIG. 4) is periodic, similar to the dependence of other anti-reflection layers known in the field, with a tolerance to changes in thickness of the SiN focusing layer 410 and/or the oxide layer on the order of magnitude of the wavelength in the layers.

In the depicted embodiment of FIG. 4, the SiN focusing layer 410 is patterned, with a plurality of slits etched through the entire thickness of the SiN focusing layer 410. Patterning the SiN focusing layer 410 provides more degrees of freedom to the grating coupler optimization. The SiN focusing layer 410 pattern can be determined through a similar optimization approach discussed above for determining the design of the grating sections of the stagger-tuned grating coupler 400. The pattern etched into the SiN focusing layer 410 may comprise a plurality of focusing sections 420a, 420b, 420c (collectively, "the focusing sections 420"). In various embodiments, each focusing section 420 may be configured with trench widths and pitches designed to further balance the competing effects of mode overlap, back-reflections, and directionality of the first grating section 106a and the second grating section 106b to increase the overall bandwidth of the stagger-tuned grating coupler 400.

As illustrated in FIG. 4, the SiN focusing layer 410 includes two etched focusing sections 420a, 420c and a non-etched focusing section 420b. Each of the two etched focusing sections 420a, 420c can be configured to provide additional angle correction for off-vertical scattering that is occurring at the ends of the grating layer (i.e., first grating section 106a, second grating section 106b) of the planar waveguide 102. Non-etched focusing sections, such as focusing section 420b, can be configured to reduce the back reflection of light into the planar waveguide 102. In various embodiments, non-etched focusing sections (e.g., focusing section 420b) may be configured to maintain the directionality enhancement achieved by the first grating section 106a and the second grating section 106b, and may be positioned close to the portion of the grating layer (i.e., the first grating section 106a and the second grating section 106b) having the strongest scattering power (i.e., with a duty cycle at or near 50%). In the illustrated embodiments of FIG. 4, the number of focusing sections 420 is greater than the number of grating sections 106. In various embodiments, the number of focusing sections 420 may be greater than the number of grating line subsets of the grating sections 106. In other embodiments, the number of focusing sections 420 may be equal to the number of grating sections 106 or the number of grating line subsets of the grating sections 106, while in other embodiments the number of focusing sections 420 is less than the number of grating sections 106 or the number of grating line subsets. In some embodiments, one or more of the focusing sections 420 may be configured to correspond to a respective grating section 106 or grating line subset of a grating section 106. The action of the SiN focusing layer can be thought of as similar to a traditional diffraction grating with a chirped pitch (i.e., varying pitches based on grating line). The SiN focusing layer 410 can further be considered an optical phase mask or binarized lens which slows vertical light emanating from the center of the grating while focusing light that is diffracting off-vertically at the edges. In various embodiments, the SiN focusing layer 410 may not be patterned, having no slits etched therein. The SiN focusing layer 410 improves the upward directionality of the stagger-tuned grating coupler 400 by reducing the impedance mismatch between farfield radiated light and guided waveguide modes. This is similar to but inverse of tuning the thickness of the insulating layer 404 to prevent radiation to the substrate 402, as well as assisting in cancelling the back-reflection of a vertical grating coupler.

Similar to the stagger-tuned grating couplers discussed above with respect to FIGS. 1 and 2, the stagger-tuned grating coupler 400 can include a single-etch grating layer of the planar waveguide 102, comprising the first grating section 106a and the second grating section 106b. The term "single-etch" used herein refers to the method by which a given design of a layer of the device is manufactured. Specifically, the idea of a "single-etch" refers to the uniformity in the etch depth of the various grating sections. For example, the stagger-tuned grating coupler 400 is referred to as a "single-etch" coupler in the present disclosure because the first grating section 106a and the second grating section 106b have the same etch depth. In this way, the first grating section 106a and the second grating section 106b can be fabricated in a single etching process, reducing the fabrication complexity of the stagger-tuned grating coupler 400. This is different from more complex designs that require multiple etch depths (i.e., multiple etching steps and/or times to achieve various depths). In embodiments where a patterned SiN focusing layer 410 is included, the resulting device is still considered a "single-etch" grating coupler design herein because the first grating section 106a and the second grating section 106b have the same etch depth D, even though the SiN focusing layer 410 is also etched to achieve the designed pattern. As discussed above, the net vertical scattering effect is mainly achieved by the first grating section 106a and the second grating section 106b, with the SiN focusing layer 410 only improving upon this performance. Therefore, embodiments in accordance with the present disclosure provides a single-etch stagger-tuned grating coupler that is capable of achieving net scattering angles with only the single-etched layer of the target waveguide (i.e., planar waveguide 102 of FIGS. 1-4) without the need of any additional layers or etching patterns.

Even using the SiN focusing layer 410, the combination of stagger-tuned grating coupler 400 and SiN focusing layer 410 still provides a robust device that is less susceptible to fabrication errors, such as misalignment of the layers. Simulations of grating couplers in accordance with depicted embodiment of FIG. 4 (i.e., with a patterned SiN focusing layer 420) maintain an insertion loss of greater than −1.0 dB at a wavelength of 1310 nm for misalignment as large as ±1 µm. This is well within the expected three standard deviation optical alignment tolerance for known lithography techniques, such as immersion lithography. Because the SiN focusing layer 410 mainly serves as an anti-reflection layer and not as a separate diffraction grating, the resulting embodiment depicted in FIG. 4 is capable of handling a misalignment on the scale of the freely-propagating output wave of the grating. Optimizing the grating coupler/focusing layer combination results in an improvement in the peak insertion loss (i.e., −0.52 dB) and 1 dB-badwidth (i.e., 24 nm) compared to the stagger-tuned grating coupler 400 alone. The greater tolerance for misalignment of the SiN focusing layer 410 and the grating sections 106 can be attributed in part to the positioning of the different focusing sections 420 of the SiN focusing layer 410.

Utilizing the multiple wavelength optimization protocol discussed above, embodiments of the present disclosure provide an immense bandwidth benefit to the design of single-etch grating couplers by stagger-tuning different sections of the grating coupler. Although a trade-off is made with respect to the peak insertion loss when optimizing for multiple wavelengths through stagger tuning, it is possible to design a single-etch layer coupler that obtains a desired coupling efficiency vs. bandwidth trade-off needed for specific implementations of a photonic link. Moreover, as discussed above, the performance of the single-etch grating couplers (i.e., the planar waveguide 102 with the grating sections 106 etched therein) may be improved further by including a focusing layer, which adds more degrees of freedom for optimizing the net scattering effect and performance of the grating coupler.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters. For purposes of the present disclosure, "optimizing" the design of the grating sections of the stagger-tuned grating couplers discussed herein encompasses optimizing designs with the feature sizes restricted such that the size of the trenches and grating elements do not violate the critical dimensions of the applicable fabrication process. This restriction can be embodied in the penalty function discussed above in various embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A grating coupler, comprising:
a planar waveguide;
a first grating section comprising a first plurality of trenches etched into the planar waveguide, wherein the first grating section comprises a first grating line subset and a second grating line subset, each grating line subset comprising a number of periods of the first grating section; and
a second grating section comprising a second plurality of trenches etched into the planar waveguide,
wherein the first plurality of trenches and the second plurality of trenches comprise a single-etch layer having a uniform depth, and wherein the first grating section is configured to scatter light of a first wavelength at a first angle relative to vertical and the second grating section is configured to scatter light of the first wavelength at a second angle relative to vertical such that light of the first wavelength is scattered by the grating coupler at a desired angle relative to vertical.

2. The grating coupler of claim 1, wherein the first grating section comprises a same number of trenches as the second grating section.

3. The grating coupler of claim 1, wherein the first grating section comprises a different number of trenches as the second grating section.

4. The grating coupler of claim 1, wherein the grating coupler is disposed on a silicon on insulator (SOI) device.

5. The grating coupler of claim 1, wherein a width of each trench associated with each grating line and the pitch of each grating line of the first grating index subset is configured to increase parabolically based on the grating line.

6. The grating coupler of claim 1, wherein the second grating line subset is configured with a constant trench width and a constant pitch for each trench of the second grating line subset based on the grating line.

7. The grating coupler of claim 6, wherein the constant trench width and the constant pitch is configured to have a duty cycle at or near 50%.

8. The grating coupler of claim 1, wherein a width of a first trench of the second grating section is wider than a width of the last trench of the first grating section.

9. A grating coupler, comprising:
a planar waveguide;
a first grating section comprising a first plurality of trenches etched into the planar waveguide,
a second grating section comprising a second plurality of trenches etched into the planar waveguide,
wherein the first plurality of trenches and the second plurality of trenches comprise a single-etch layer having a uniform depth, and wherein the first grating section is configured to scatter light of a first wavelength at a first angle relative to vertical and the second grating section is configured to scatter light of the first wavelength at a second angle relative to vertical such that light of the first wavelength is scattered by the grating coupler at a desired angle relative to vertical, and
wherein:
the grating coupler is optimized for a first wavelength of 1275 nm and a second wavelength of 1323 nm;

the first grating section is configured to scatter light of the first wavelength at 11.5 degrees relative to vertical and to scatter light of the second wavelength at 7.2 degrees relative to vertical;
the second grating section is configured to scatter light of the first wavelength at 6.7 degrees relative to vertical, and
the combined effective scattering angle of light of the first wavelength is roughly 8 degrees relative to vertical.

10. An apparatus, comprising:
a silicon substrate;
a buried insulating layer disposed above the silicon substrate;
a planar waveguide disposed on the buried insulating layer; and
a grating coupler, comprising:
a first grating section comprising a first plurality of trenches etched into the planar waveguide, wherein the first grating section comprises a first grating line subset and a second grating line subset, each grating line subset comprising a number of periods of the first grating section; and
a second grating section comprising a second plurality of trenches etched into the planar waveguide,
wherein the first plurality of trenches and the second plurality of trenches comprise a single-etch layer having a uniform depth, and wherein the first grating section is configured to scatter light of a first wavelength at a first angle relative to vertical and the second grating section is configured to scatter light of the first wavelength at a second angle relative to vertical such that light of the first wavelength is scattered by the grating coupler at a desired angle relative to vertical.

11. A grating coupler, comprising:
a planar waveguide;
a first grating section comprising a first plurality of trenches etched into the planar waveguide,
a second grating section comprising a second plurality of trenches etched into the planar waveguide,
wherein the first plurality of trenches and the second plurality of trenches comprise a single-etch layer having a uniform depth, and wherein the first grating section is configured to scatter light of a first wavelength at a first angle relative to vertical and the second grating section is configured to scatter light of the first wavelength at a second angle relative to vertical such that light of the first wavelength is scattered by the grating coupler at a desired angle relative to vertical, and
wherein the desired angle comprises an angle at which an optical fiber is disposed above the grating coupler and relative to vertical.

12. The grating coupler of claim 11, wherein the desired angle is at or near zero such that light is scattered in a vertical direction.

13. A single-etch vertical grating coupler, comprising:
a planar waveguide;
a first grating section comprising a first plurality of trenches etched into the planar waveguide; and
a second grating section comprising a second plurality of trenches etched into the planar waveguide,
wherein the first grating section and the second grating section are optimized for multiple wavelengths, each wavelength of the multiple wavelengths associated with a user-defined weight,
wherein the first plurality of trenches and the second plurality of trenches comprise a single-etch layer having a uniform depth, and wherein the first grating section is configured to scatter light of a first wavelength at a negative angle relative to vertical and the second grating section is configured to scatter light of the first wavelength at a positive angle relative to vertical such that light of the first wavelength is scattered in a vertical direction.

14. The single-etch vertical grating coupler of claim 13, wherein the first grating section comprises a same number of trenches as the second grating section.

15. The single-etch vertical grating coupler of claim 13, wherein the first grating section comprises a different number of trenches as the second grating section.

16. A single-etch vertical grating coupler, comprising:
a planar waveguide;
a first grating section comprising a first plurality of trenches etched into the planar waveguide;
a second grating section comprising a second plurality of trenches etched into the planar waveguide, wherein the first plurality of trenches and the second plurality of trenches comprise a single-etch layer having a uniform depth, and wherein the first grating section is configured to scatter light of a first wavelength at a negative angle relative to vertical and the second grating section is configured to scatter light of the first wavelength at a positive angle relative to vertical such that light of the first wavelength is scattered in a vertical direction; and
a silicon nitride (SiN) focusing layer disposed above the first grating section and the second grating section.

17. The single-etch vertical grating coupler of claim 16, further comprising an oxide layer disposed between the SiN focusing layer and the first grating section and the second grating section.

18. The single-etch vertical grating coupler of claim 16, wherein the SiN focusing layer is patterned.

* * * * *